US012138936B2

(12) United States Patent
Wakatsuki et al.

(10) Patent No.: US 12,138,936 B2
(45) Date of Patent: Nov. 12, 2024

(54) LIQUID STORAGE CONTAINER

(71) Applicant: CANON KABUSHIKI KAISHA, Tokyo (JP)

(72) Inventors: Shoki Wakatsuki, Tokyo (JP); Hiroki Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 17/936,595

(22) Filed: Sep. 29, 2022

(65) Prior Publication Data

US 2023/0099942 A1 Mar. 30, 2023

(30) Foreign Application Priority Data

Sep. 30, 2021 (JP) ................................ 2021-161185

(51) Int. Cl.
*B41J 2/175* (2006.01)

(52) U.S. Cl.
CPC ....... *B41J 2/17556* (2013.01); *B41J 2/17513* (2013.01); *B41J 2/1754* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 2/17556
See application file for complete search history.

(56) References Cited

U.S. PATENT DOCUMENTS

2001/0040610 A1* 11/2001 Kurata ................. B41J 2/17556 347/85
2007/0046742 A1* 3/2007 Inoue ................... B41J 2/17506 347/85
2022/0097388 A1* 3/2022 Nanjo ................. B41J 2/17523

FOREIGN PATENT DOCUMENTS

JP 2018161876 A 10/2018

* cited by examiner

*Primary Examiner* — Anh T Vo
(74) *Attorney, Agent, or Firm* — Canon U.S.A., Inc. IP Division

(57) ABSTRACT

Disclosed is a liquid storage container comprising a liquid reservoir part holding liquid, an air communication part including an air communication port communicating with the atmosphere, an inner port communicating the liquid reservoir part with the air communication part, a seal member closing the inner port from the inside of the air communication part, a first biasing member biasing the seal member in a first direction from a first position away from the inner port toward a second position of closing the inner port, and a pressure receiving part including a protruding portion protruding from the air communication port to the outside of the air communication part, and joined to the seal member or the first biasing member. The seal member is separated from the inner port when the protruding portion of the pressure receiving part is pushed in a second direction opposite to the first direction.

20 Claims, 10 Drawing Sheets

LIQUID STORAGE CONTAINER

BACKGROUND

Field of the Disclosure

The present disclosure relates to a liquid storage container capable of being detachably attached to a printing apparatus

Description of the Related Art

Japanese Patent Application Laid-Open No. 2018-161876 discloses a liquid cartridge detachably attached to a printer body. As shown in FIGS. 9 and 10, the liquid cartridge has an air flow passage 590 having an air communication port 510 and a liquid reservoir chamber 580 for reserving a liquid, and a valve 500 is provided in a through hole 560 for communicating the air flow passage 590 with the liquid reservoir chamber 580. The valve 500 comprises a lever 520, a valve element 530, a coil spring 540, a seal member 550 and the like. In the liquid cartridge before attached, the seal member 550 closes the through hole 560 by biasing force of the coil spring 540. When the liquid cartridge is attached to the printer main body, the lever 520 is brought down by a pressing part 570, and the valve element 530 moves in a direction opposite to the biasing direction of the coil spring 540. As a result, the seal member 550 is separated from the through hole 560, and the liquid reservoir chamber 580 is switched to an open state communicating with the air communication port 510.

In the liquid cartridge disclosed in Japanese Patent Application Laid-Open No. 2018-161876, the cost is high because the number of parts of the valve 500 is large. Further, even if the liquid cartridge is removed from the printer main body, the lever 520 remains in the open state in the fallen state, so that liquid may leak from the liquid cartridge.

SUMMARY

The present disclosure provides a liquid storage container capable of reducing the cost and preventing leakage of the liquid.

Embodiments of the present disclosure include a liquid storage container with a liquid reservoir part configured to hold a liquid, an air communication part including an air communication port communicating with air, an inner communication port configured to communicate the liquid reservoir part with the air communication part, a seal member configured to close the inner communication port from the inside of the air communication part, a first biasing member configured to bias the seal member in a first direction from a first position away from the inner communication port toward a second position of closing the inner communication port, and a pressure receiving part including a protruding portion protruding from the air communication port to an outside of the air communication part, and joined to the seal member or the first biasing member.

In the liquid storage container according to the present disclosure, the seal member is separated from the inner communication port when the protruding portion of the pressure receiving part is pushed in a second direction opposite to the first direction.

Further features of the present disclosure will become apparent from the following description of exemplary embodiments with reference to the attached drawings.

DESCRIPTION OF THE EMBODIMENTS

Embodiments of the present disclosure will now be described in detail with reference to the drawings. However, the components described in the embodiments are merely examples and are not intended to limit the scope of the present disclosure to them.

First Embodiment

Figure 1:
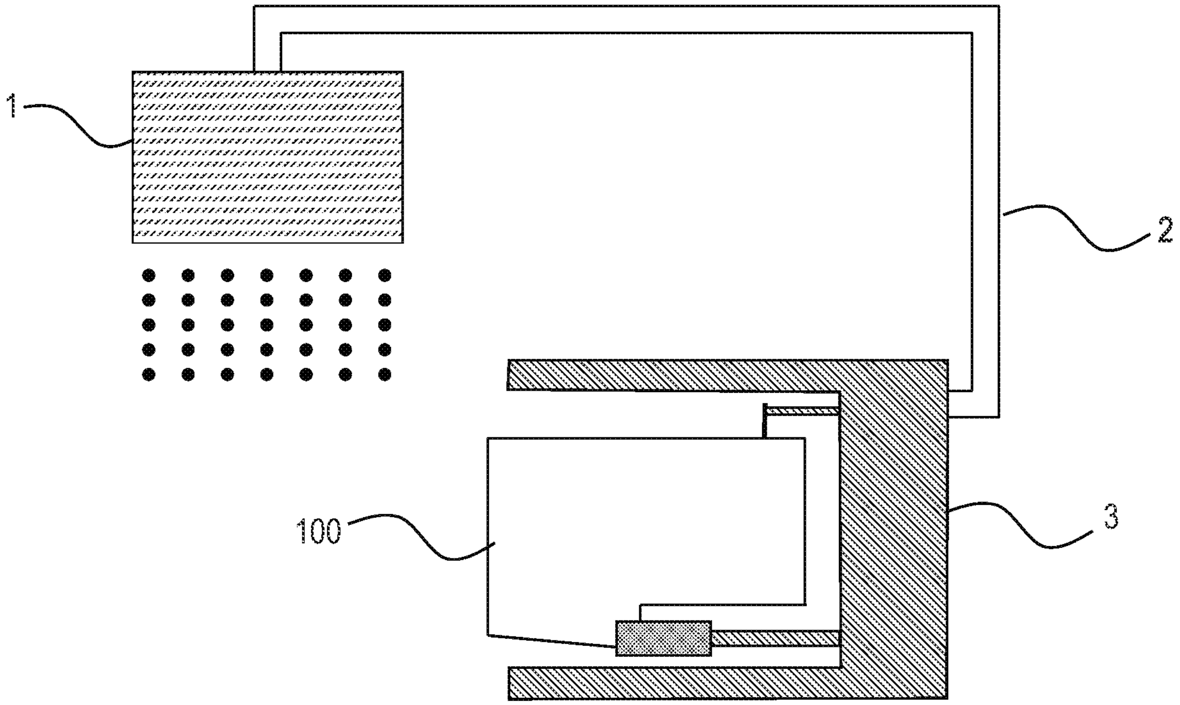
FIG. 1 is a schematic view showing a main configuration of a printing apparatus to which a liquid storage container of the present disclosure is applied.

FIG. 1 is a schematic view showing a main configuration of a printing apparatus to which a liquid storage container of the present disclosure is applied. The printing apparatus is an ink jet printing apparatus for ejecting a liquid such as ink. The printing apparatus includes a holder 3 for holding a liquid storage container 100 according to a first embodiment of the present disclosure, and a printing head 1 to which a liquid is supplied from the liquid storage container 100 held by the holder 3 via a tube 2. The liquid storage container 100 is detachably attached to the holder 3. The printing head 1 is mounted on a carriage, for example, and discharges the liquid toward a printing medium such as paper. The liquid consumed by the ejection is supplied to the printing head 1 from the liquid storage container 100.

Next, a configuration of the liquid storage container 100 according to the first embodiment of the present disclosure will be described in detail.

Figure 2:
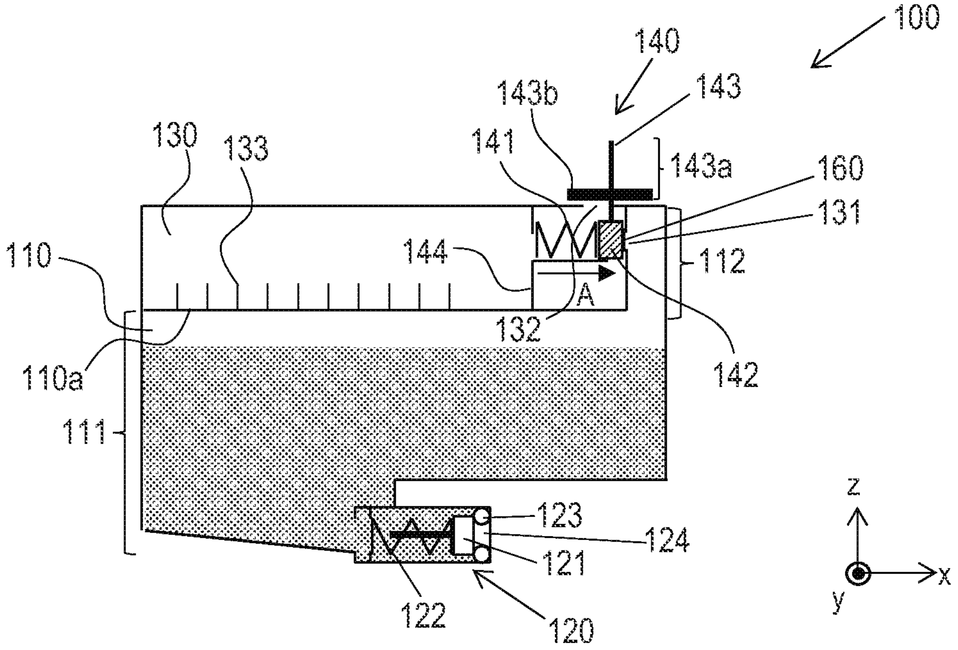
FIG. 2 is a cross sectional view showing a configuration of the liquid storage container according to a first embodiment of the present disclosure.

FIG. 2 is a cross sectional view showing the configuration of the liquid storage container 100. FIG. 2 shows a configuration of a cross section obtained by cutting in the vertical direction along the longitudinal direction of the liquid storage container 100. In FIG. 2, a z-axis indicates a vertical direction, an x-axis and a y-axis indicate horizontal directions, and the axes are orthogonal to each other.

Referring to FIG. 2, the liquid storage container 100 includes a liquid reservoir part 110, an air communication part 130, and a liquid supply part 120. The liquid reservoir part 110, the air communication part 130, and the liquid supply part 120 are integrally formed. The liquid reservoir part 110 holds a liquid such as ink.

The air communication part 130 is provided with an air communication port 132 communicating with an atmosphere.

The liquid supply part 120 supplies the liquid held in the liquid reservoir part 110 to the printing head 1. When the liquid is supplied to the printing head 1, an inside of the liquid reservoir part 110 becomes a negative pressure state, but the internal pressure of the liquid reservoir part 110 is kept uniform because the external air is taken into the liquid reservoir part 110 through the air communication part 130.

The configuration of each part of the liquid storage container 100 will be described in detail below.

(Liquid Reservoir Part)

The liquid reservoir part 110 and the air communication part 130 are partitioned by a partition plate 110*a*. The partition plate 110*a* has an L-shaped form and has a horizontal part and a vertical part. The horizontal part of the partition plate 110*a* partitions the liquid reservoir part 110 and the air communication part 130 to an upper part and a lower part in the z-axis direction. The vertical part of the partition plate 110*a* partitions the liquid reservoir part 110 and the air communication part 130 to a left part and a right part in the x-axis direction. The liquid reservoir part 110 has a main body part 111 partitioned by a horizontal part of the partition plate 110*a* and an upper protruding part 112 partitioned by a vertical part of the partition plate 110*a*.

The main body part 111 and the upper protruding part 112 are communicated with each other. The upper protruding part 112 is located above the main body part 111. The main body part 111 has a bottom part of the liquid reservoir part 110, and a liquid supply part 120 is provided at the bottom part. The bottom surface of the main body part 111 is inclined downwardly toward the liquid supply part 120. Such inclined surface allows the liquid to be supplied to the printing head 1 without remaining on the bottom surface of the main body part 111.

(Liquid Supply Part)

Figure 3A:
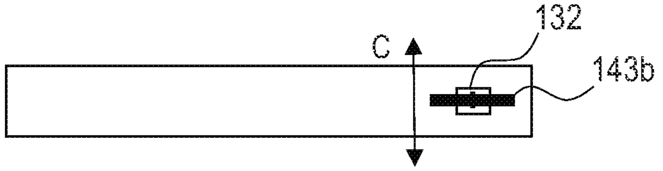
FIGS. 3A and 3B are schematic views showing a state immediately before the liquid storage container shown in FIG. 2 is attached to a holder.
Figure 3B:
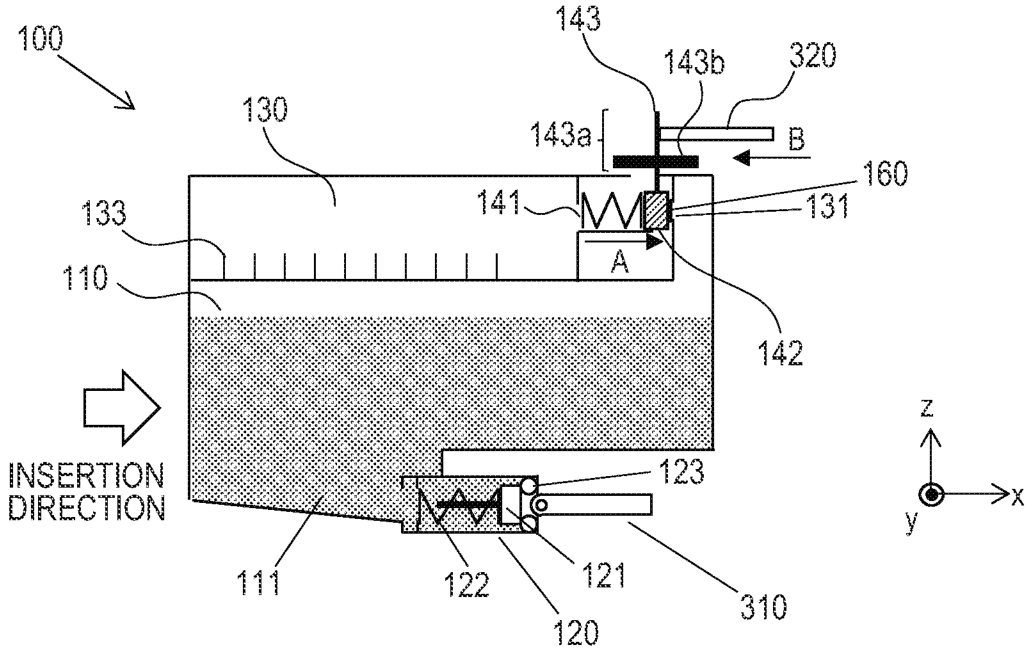
Figure 4:
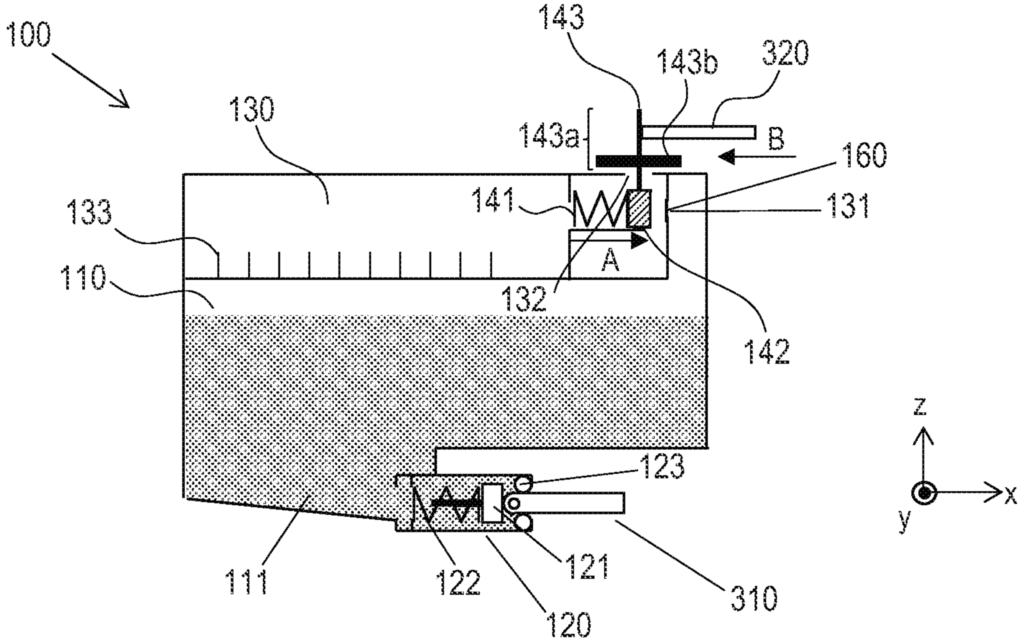
FIG. 4 is a schematic view showing the liquid storage container shown in FIG. 2 fully attached to the holder.

Next, the configuration of the liquid supply part 120 will be described in detail with reference to FIGS. 2, 3A, 3B and 4. FIGS. 3A and 3B are views showing a state immediately before the liquid storage container 100 is attached to the holder 3, wherein FIG. 3A is a top view and FIG. 3B is a sectional view. FIG. 4 is a view showing a state in which the liquid storage container 100 is completely attached to the holder 3. FIGS. 3B and 4 show structures in the same cross section as that in FIG. 2. In FIGS. 3A, 3B and 4, only the joint needle 310 and the pressing portion 320 are shown as the constituent members of the holder 3 for convenience.

The liquid supply part 120 includes a liquid supply port 124, a valve element 121, a valve spring 122 and an annular joint seal 123. The valve element 121 is made of a resin material. The valve spring 122 is made of a metal material. The joint seal 123 is made of an elastic member such as rubber and is attached to the liquid supply port 124. The valve spring 122 biases the valve element 121 toward the joint seal 123. By the biasing force of the valve spring 122, the valve element 121 closes the liquid supply port 124 to which the joint seal 123 is attached.

In a state immediately before attached as shown in FIGS. 3A and 3B, the liquid supply port 124 is closed by the valve element 121. When the liquid storage container 100 is attached to the holder 3, the joint needle 310 is inserted into the liquid supply port 124 as shown in FIG. 4. The joint needle 310 comprises a hollow member and is connected to the tube 2. The joint needle 310 constitutes the end of the liquid supply system provided on the printing apparatus. The joint needle 310 moves inside the liquid supply port 124 toward the valve element 121 while maintaining sealing property by being in close contact with the joint seal 123. The joint needle 310 pushes the valve element 121 in a direction opposite to the biasing direction of the valve spring 122.

By a pushing pressure of the joint needle 310, the valve element 121 is moved in a direction opposite to the biasing direction of the valve spring 122 and separated from the liquid supply port 124. Thereby, the liquid supply port 124 is opened, and the liquid can be supplied from the liquid storage container 100 to the printing head 1.

When the liquid storage container 100 is detached from the holder 3, the joint needle 310 moves inside the liquid supply port 124 in the direction opposite to the insertion direction (the same direction as the biasing direction of the valve spring 122) while maintaining the sealing property by the joint seal 123. As the joint needle 310 exits the liquid supply port 124, the biasing force of the valve spring 122 causes the valve element 121 to close the liquid supply port 124.

(Air Communication Part)

Next, the configuration of the air communication part 130 will be described in detail with reference to FIGS. 2, 3A, 3B and 4. The air communication part 130 is located above the liquid reservoir part 110. The air communication port 132 is disposed on the upper surface of the air communication part 130. The vertical part of the partition plate 110*a* constitutes a side wall that partitions the upper protruding part 112 of the liquid reservoir part 110 from the air communication part 130. An inner communication port 131 communicating the liquid reservoir part 110 with the air communication part 130 is provided on the side wall. A gas-liquid separation membrane 160 for separating gas and liquid is provided in an opening portion of the inner communication port 131. The gas-liquid separation membrane 160 suppresses leakage of liquid held in the liquid reservoir part 110 to the air communication part 130 side even when the printing apparatus is inclined somewhat. The gas-liquid separation membrane 160 preferably has low flow resistance and low liquid permeability. For example, a water-repellent filter can be used for the gas-liquid separation membrane 160.

The horizontal part of the partition plate 110*a* constitutes the bottom surface of the air communication part 130. A plurality of ribs 133 are provided on the bottom surface of the air communication part 130. Each of the plurality of ribs 133 is formed of a wall like member perpendicular to the bottom surface and is provided adjacent to each other so that the liquid can be held by a capillary force. For example, even if the liquid leaks from the inner communication port 131 into the air communication part 130, the liquid can be held between the ribs 133 by the capillary force. By holding the liquid by using the ribs 133, the liquid is prevented from leaking out of the air communication port 132.

A valve unit 140 is provided inside the air communication part 130. The valve unit 140 has a first biasing member 141, a seal member 142, and a pressure receiving part 143. The first biasing member 141 is made of a metal coil spring or the like (hereinafter, it is also referred to as a coil spring 141). The seal member 142 is made of an elastic member such as rubber. The pressure receiving part 143 is made of metal, plastic or the like.

The spring support part 144 supports one end of the coil spring 141. The seal member 142 is attached to the other end of the coil spring 141. The seal member 142 slides on the spring support part 144 in the x-axis direction. The seal member 142 is movable between a first position away from the inner communication port 131 and a second position of closing the inner communication port 131. The coil spring 141 biases the seal member 142 in a first direction (arrow A) from the first position toward the second position. Here, the inner communication port 131 is provided on the side wall orthogonal to the first direction (arrow A), and the coil spring 141 biases the seal member 142 toward the inner communication port 131. By providing the inner communication port 131 on the side wall orthogonal to the first direction (arrow A), the inner communication port 131 can be arranged at a higher position relative to the liquid level of the liquid in the liquid reservoir part 110, so that the liquid hardly enters the air communication part 130 from the liquid reservoir part 110. In the state immediately before attaching the liquid storage container, shown in FIG. 3A, the seal member 142 is firmly adhered to the inner communication port 131 by the biasing force of the coil spring 141, and the inner communication port 131 is closed.

The pressure receiving part 143 includes a protruding part (protruding portion) 143*a* protruding from the air communication port 132 toward the outside of the air communication part 130. An end portion of the pressure receiving part 143 opposite to the protruding part 143*a* is joined to the seal member 142 or the coil spring 141. Adhesives or two-color molding can be used for this joining. Alternatively, the end portion of the pressure receiving part 143 may be joined to the seal member 142 or the coil spring 141 by fitting. As shown in FIG. 4, when the protruding part 143*a* of the pressure receiving part 143 is pushed in a second direction (arrow B) opposite to the first direction (arrow A), the seal member 142 is separated from the inner communication port 131. As a result, a state of the liquid reservoir part 110 is switched to an open state communicating with the air communication port 132.

In the pressure receiving part 143, the biasing force of the coil spring 141 is applied to the end portion (hereinafter referred to as an inner end) joined to the seal member 142 or the coil spring 141, and in this state, the pressing pressure of the pressing portion 320 is applied to the protruding part 143*a*. Although the biasing force and the pressing pressure are parallel to each other, since forces act in opposite directions on different axes, when the pressing portion 320 presses the protruding part 143*a*, a force is exerted such that the pressure receiving part 143 rotates around the seal member 142. A rotation of the pressure receiving part 143 includes a rotation about the y-axis and a rotation about the x-axis. Due to such rotations, the pressure receiving part 143 is caught by the air communication port 132, or the seal member 142 cannot be moved in the second direction (arrow B).

As a result, the inner communication port 131 may not be opened.

In order to solve the above problem, the protruding part 143*a* of the pressure receiving part 143 is provided with an extending part (extending portion) 143*b* extending in a direction parallel to the opening surface of the air communication port 132. The extending part 143*b* is provided adjacent to the air communication port 132 and extends in at least one of a second direction (arrow B) and a third direction (arrow C) orthogonal to the second direction and parallel to the opening surface. The extending part 143*b* is longer than the opening surface of the air communication port 132. Here, as shown in FIG. 3B, the extending part 143*b* extends along the second direction (arrow B) and is longer than the opening width of the air communication port 132 in the second direction (arrow B).

The air communication port 132 has an opening shape elongated in the second direction (arrow B). Thus, the movement amount (stroke amount) of the seal member 142 can be secured. Here, the opening shape of the air communication port 132 is rectangular, but is not limited thereto. When the pressing portion 320 presses the protruding part 143*a*, the extending part 143*b* contacts an outer surface of the air communication part 130, thereby suppressing the rotation of the pressure receiving part 143. Since the extending part 143*b* slides on the outer surface of the air communication part 130, the movement of the seal member 142 in the second direction (arrow B) is not prevented.

According to the liquid storage container 100 of the present embodiment described above, the seal member 142 closes the inner communication port 131 in the detached state, and the liquid reservoir part 110 is kept in a sealed state. Since the liquid storage container 100 is transported in this state, the liquid reserved in the liquid reservoir part 110 does not leak out to the outside of the liquid storage container 100.

As shown in FIGS. 3A and 3B, the liquid storage container 100 is attached to the holder 3 with the upper protruding part 112 facing the holder 3. When the liquid storage container 100 is attached to the holder 3, the joint needle 310 abuts on the liquid supply part 120 and the pressing portion 320 abut on the protruding part 143*a* of the pressure receiving part 143. As shown in FIG. 4, when the liquid storage container 100 is further inserted into the holder 3, the pressing portion 320 presses the protruding part 143*a* in the second direction (arrow B), and the coil spring 141 is contracted. In conjunction with the contraction of the coil spring 141, the seal member 142 also slides in the second direction (arrow B) and separates from the inner communication port 131. As a result, the liquid reservoir part 110 communicates with the outside air through the air communication part 130. Further, by inserting the joint needle 310 into the liquid supply port 124, the liquid reservoir part 110 communicates with the printing head 1 through the tube 2. When the liquid reservoir part 110 communicates with the atmosphere and the printing head 1, the attachment of the liquid storage container 100 to the holder 3 is completed.

When the liquid storage container 100 is detached from the holder 3 in the state that the liquid remains in the liquid reservoir part 110, the seal member 142 makes the inner communication port 131 closed by the biasing force of the coil spring 141. Therefore, in a case where the liquid storage container 100 is held in any of postures, the liquid in the liquid reservoir part 110 does not leak out.

Even if the posture of the printing apparatus is changed while the liquid storage container 100 is attached to the holder 3 (see FIG. 4), the liquid does not leak out of the liquid reservoir part 110 as long as the gas-liquid separation membrane 160 is not broken. Even if the gas-liquid separation membrane 160 is broken by any chance, since the ribs 133 provided on the bottom surface of the air communication part 130 holds the liquid, the amount of leakage of the liquid to the outside can be reduced.

Next, the effects of the liquid storage container 100 according to the present embodiment will be described in comparison with the liquid cartridge disclosed in Japanese Patent Application Laid-Open No. 2018-161876.

Figure 9:
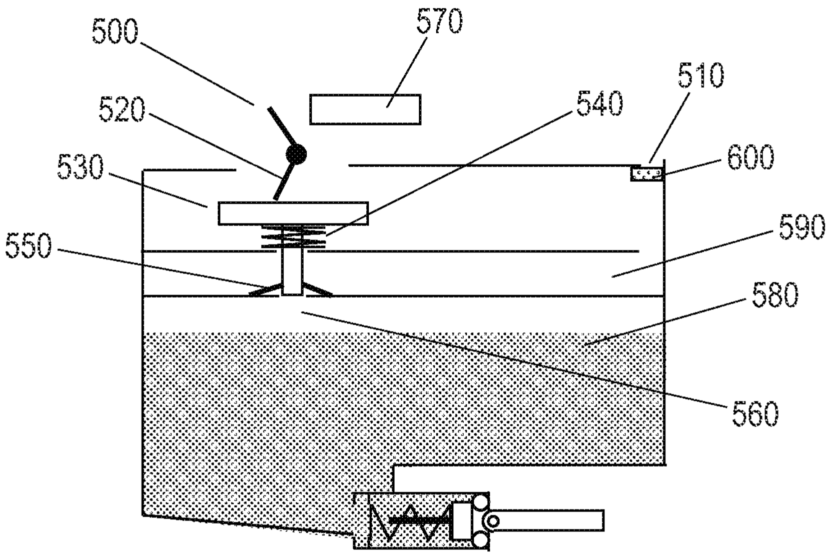
FIG. 9 is a schematic view showing a state immediately before a liquid cartridge is attached.
Figure 10:
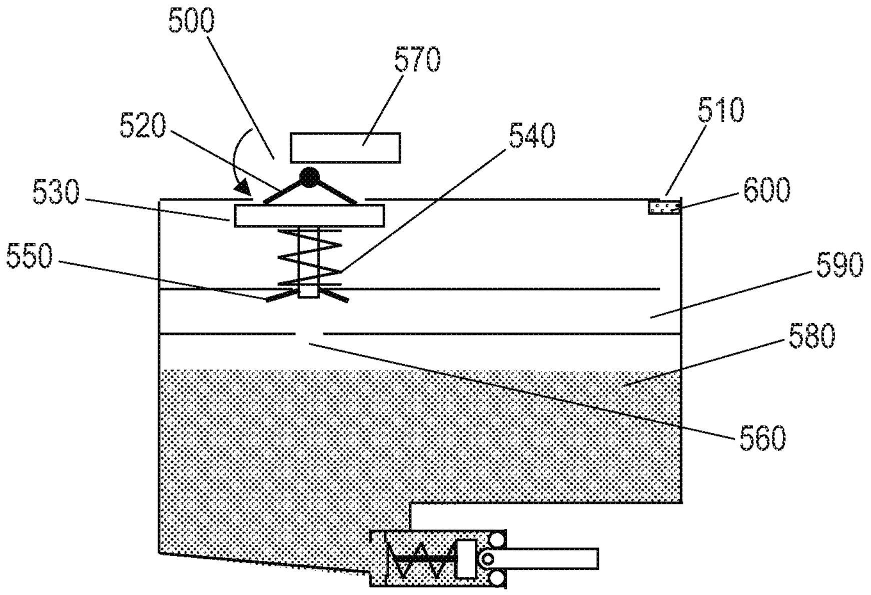
FIG. 10 is a schematic view showing the liquid cartridge after attached.

In the liquid cartridge disclosed in Japanese Patent Application Laid-Open No. 2018-161876, as shown in FIGS. 9 and 10, the valve 500 includes a valve element 530, a lever 520, and a support member (not shown) for rotatably holding the lever, in addition to a coil spring 540 and a seal member 550. Thus, if the number of components of the valve 500 is large, the component cost increases. In addition, the number of assembly manufacturing processes will increase, resulting in an increase in processing costs.

In contrast, according to the liquid storage container 100 of the present embodiment, the valve unit 140 has a three-elements configuration consisting of the coil spring 141, the seal member 142, and the pressure receiving part 143. As described above, the number of parts of the valve unit 140 is smaller than that of the liquid cartridge disclosed in Japanese Patent Application Laid-Open No. 2018-161876, so that the cost can be reduced.

Further, since the liquid cartridge disclosed in Japanese Patent Application Laid-Open No. 2018-161876 maintains an open state even when detached from the printer main body, there is a possibility that liquid leaks from the liquid cartridge when the liquid remains in the liquid reservoir chamber 580.

On the other hand, when the liquid storage container 100 of the present embodiment is detached from the printing apparatus, the seal member 142 closes the inner communication port 131, so that the liquid does not leak from the liquid storage container 100 even if the liquid remains in the liquid reservoir part 110.

Furthermore, in the liquid cartridge disclosed in Japanese Patent Application Laid-Open No. 2018-161876, the amount of usable liquid is reduced because the liquid enters an air flow passage 590 from the liquid reservoir chamber 580 through the through hole 560 due to a change in the posture of the printer main body in a state of being attached to the printer main body.

On the other hand, in the liquid storage container 100 of the present embodiment, since the gas-liquid separation membrane 160 is provided in the inner communication port 131, liquid does not leak from the liquid reservoir part 110 to the air communication part 130 due to a change in the posture of the printing apparatus. Therefore, the amount of usable liquid is not reduced.

[Modification Example]

Figure 5:
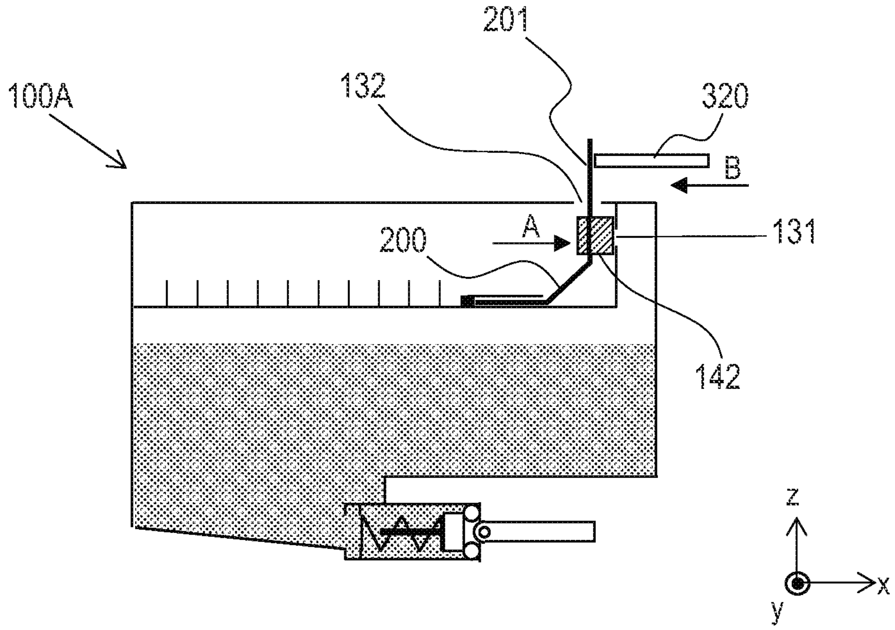
FIG. 5 is a schematic view showing a modification of the liquid storage container according to the first embodiment of the present disclosure.

FIG. 5 is a view showing a modification of the liquid storage container 100 of the present embodiment. A liquid storage container 100A of the present modification is different from the liquid storage container 100 in that a leaf spring 200 and a pressure receiving part 201 are provided instead of the coil spring 141 and the pressure receiving part 143.

The leaf spring 200 is a biasing member. The leaf spring 200 is fixed to the horizontal part of the partition plate 110*a*, and biases the seal member 142 toward the inner communication port 131. The biasing direction of the leaf spring 200 is the first direction (arrow A).

Like the pressure receiving part 143, the pressure receiving part 201 has a protruding part protruding from the air communication port 132 to the outside of the air communication part 130, and is joined to the leaf spring 200 or the seal member 142. Here, the pressure receiving part 201 and the leaf spring 200 are integrally formed.

The pressing portion 320 provided in the holder 3 presses the protruding part of the pressure receiving part 201 in a second direction (arrow B) opposite to the first direction (arrow A), so that the seal member 142 is separated from the inner communication port 131. As a result, a state of the liquid reservoir part 110 is switched to an open state communicating with the air communication port 132.

The liquid storage container 100A of this present modification also exhibits the same effects as those of the liquid storage container 100. In addition, the structure has the effect of being simple. However, in the liquid storage container 100A of the present modification, since the seal member 142 is biased toward the inner communication port 131 by using the restoring force of the leaf spring 200, it is necessary to apply a uniform and high biasing force to the seal member 142 in order to surely prevent leakage of the liquid.

Second Embodiment

Figure 6:
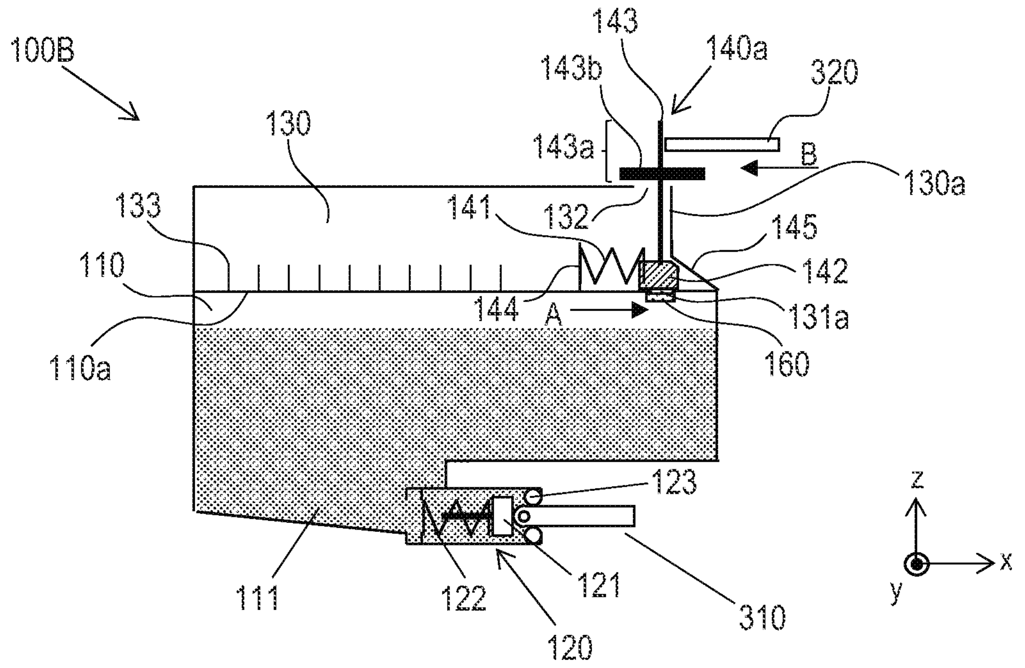
FIG. 6 is a cross sectional view showing a configuration of a liquid storage container according to a second embodiment of the present disclosure.
Figure 7:
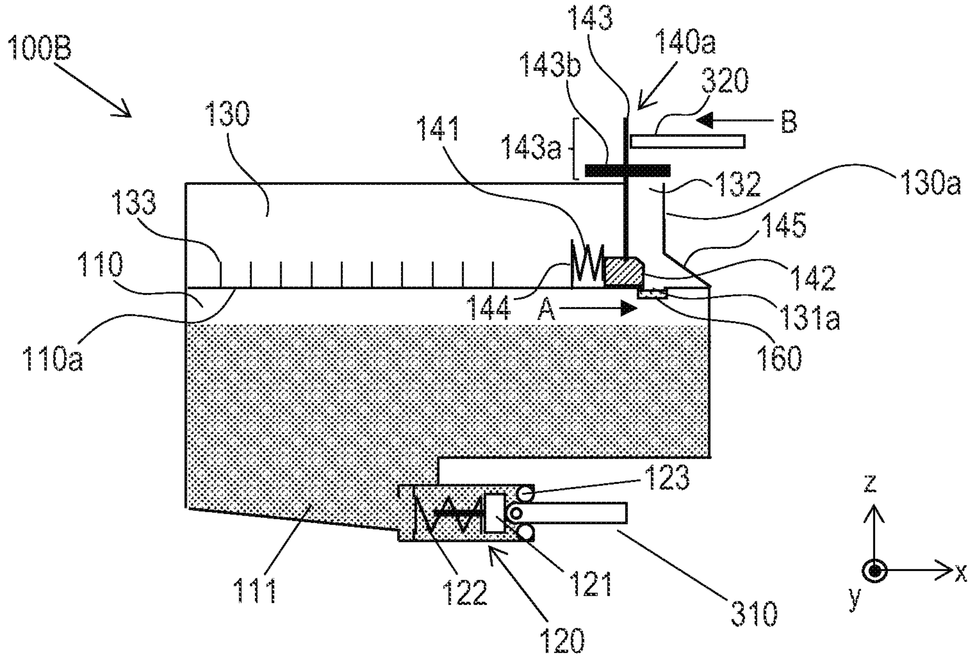
FIG. 7 is a schematic view showing the liquid storage container shown in FIG. 6 fully attached to the holder.

FIGS. 6 and 7 are cross sectional views showing the configuration of a liquid storage container 100B according to the second embodiment of the present disclosure. FIG. 6 shows a state immediately before the liquid storage container 100B is attached to the holder 3.

FIG. 7 shows a state in which the liquid storage container 100B is completely attached to the holder 3. FIGS. 6 and 7 show the configuration of a cross section cut in the vertical direction along the longitudinal direction of the liquid storage container 100B. In FIGS. 6 and 7, only the joint needle 310 and the pressing portion 320 are shown as the constituent members of the holder 3 for convenience.

The liquid storage container 100B of the present embodiment differs from the liquid storage container 100 of the first embodiment in that the valve unit 140*a*, the inner communication port 131*a*, and the inclined surface 145 are provided instead of the valve unit 140 and the inner communication port 131. The same components as those of the first embodiment are denoted by the same reference numerals, and descriptions of these components are omitted here in order to avoid duplication of descriptions.

Like the valve unit 140, the valve unit 140*a* includes a coil spring 141, a seal member 142, and a pressure receiving part 143. The partition plate 110*a* is composed only of the horizontal part, and the liquid reservoir part 110 does not have the upper protruding part 112, and consists only of the main body part 111. The air communication part 130 and the liquid reservoir part 110 are vertically partitioned by the partition plate 110*a*.

The air communication part 130 has a bottom part formed of the partition plate 110*a* intersecting the longitudinal direction of the pressure receiving part 143, and a side wall 130*a* provided adjacent to the bottom part and provided with an inclined surface 145. The inner communication port 131*a* is provided at the bottom part of the air communication part 130. Also in this embodiment, the gas-liquid separation membrane 160 is provided in the inner communication port 131*a*.

The seal member 142 is movable between a first position away from the inner communication port 131*a* and a second position where the seal member 142 closes the inner communication port 131*a*. The coil spring 141 biases the seal member 142 in a first direction (arrow A) from the first position to the second position. The inclined surface 145 presses the seal member 142 toward the inner communication port 131*a* so that the seal member 142 is biased toward the inner communication port 131*a*. Here, the inclined surface 145 acts to press the seal member 142 in the downward direction of gravity. Thus, the seal member 142 moved to the second position by the coil spring 141 can be pressed against the inner communication port 131*a*.

The corner part of the seal member 142 abutting against the inclined surface 145 is preferably formed to a tapered form. Thus, the pressure of the seal member 142 against the inner communication port 131*a* can be made uniform, so that the reliability against liquid leakage can be improved.

The liquid storage container 100B of the present embodiment also exhibits the same effects as those of the liquid storage container 100 of the first embodiment.

In addition, as compared with the liquid storage container 100 of the first embodiment, the degree of freedom in designing the inner communication port 131*a*, the valve unit 140, and the like is high.

[Modification Example]

Figure 8:
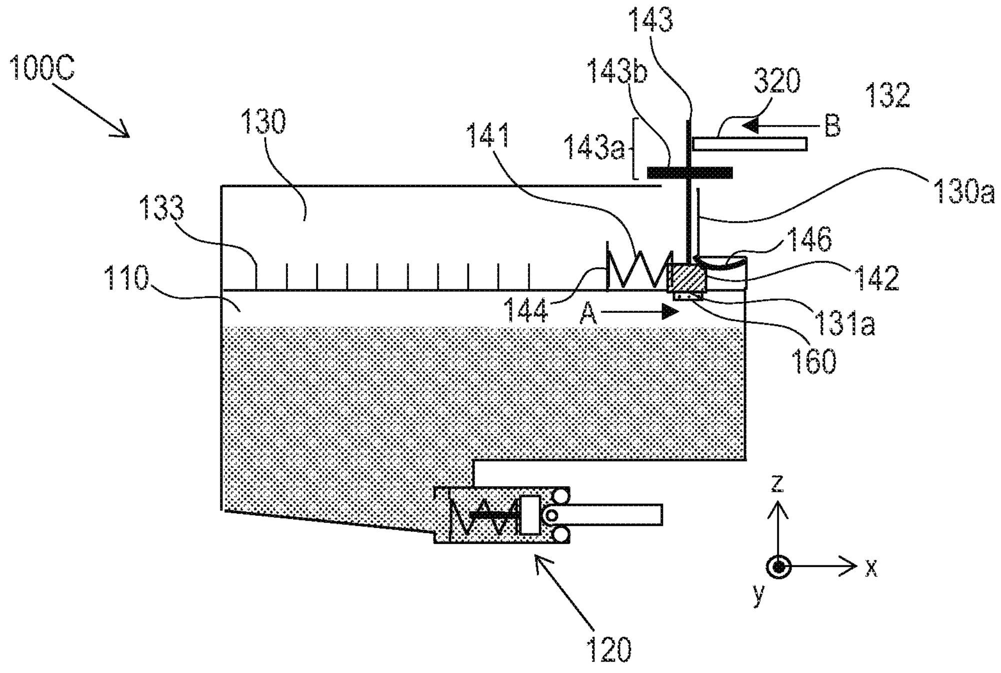
FIG. 8 is a schematic view showing a modification of the liquid storage container according to the second embodiment of the present disclosure.

FIG. 8 is a view showing a modification of the liquid storage container 100B of the present embodiment. A liquid storage container 100C of the present modification is different from the liquid storage container 100 Bin that the leaf spring 146 is provided instead of the inclined surface 145.

The leaf spring 146 serving as the second biasing member is provided on a side wall 130*a* of the air communication part 130. The leaf spring 146 biases the seal member 142 moved to the second position by the coil spring 141 toward the inner communication port 131*a*. The leaf spring 146 also acts to press the seal member 142 in the downward direction of gravity, as in the case of the inclined surface 145. Thus, the seal member 142 moved to the second position by the coil spring 141 can be pressed against the inner communication port 131*a*.

According to the present disclosure, the cost can be reduced and liquid leakage can be prevented even when removed from the printing apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-161185, filed Sep. 30, 2021, which is hereby incorporated by reference herein in its entirety.

What is claimed is:

1. A liquid storage container comprising:
- a liquid reservoir part configured to hold a liquid;
- an air communication part including an air communication port communicating with an atmosphere;
- an inner communication port configured to communicate the liquid reservoir part with the air communication part;
- a seal member configured to close the inner communication port from an inside of the air communication part;
- a first biasing member configured to bias the seal member in a first direction from a first position away from the inner communication port toward a second position of closing the inner communication port; and
- a pressure receiving part including a protruding portion protruding from the air communication port to an outside of the air communication part, and joined to the seal member or the first biasing member,
- wherein the seal member is separated from the inner communication port when the protruding portion of the pressure receiving part is pushed in a second direction opposite to the first direction, and
- wherein the air communication part has an inclined surface configured to press the seal member toward the inner communication port so that the seal member is biased toward the inner communication port.

2. The liquid storage container according to claim 1, wherein the protruding portion of the pressure receiving part has an extending portion extending in a direction parallel to an opening surface of the air communication port.

3. The liquid storage container according to claim 2, wherein the extending portion is longer than the opening surface of the air communication port.

4. The liquid storage container according to claim 2, wherein the extending portion extends in at least one of the second direction and a third direction orthogonal to the second direction and parallel to the opening surface.

5. The liquid storage container according to claim 1, wherein the air communication port has an opening shape elongated in the second direction.

6. The liquid storage container according to claim 1, wherein the air communication part includes a side wall orthogonal to the first direction, and the inner communication port is provided on the side wall.

7. The liquid storage container according to claim 6, wherein the first biasing member comprises a coil spring for biasing the seal member toward the inner communication port.

8. The liquid storage container according to claim 6, wherein the first biasing member is fixed to a bottom surface of the air communication part and comprises a leaf spring for biasing the seal member toward the inner communication port, and the pressure receiving part is formed integrally with the leaf spring.

9. The liquid storage container according to claim 1, wherein a corner part of the seal member abutting on the inclined surface is formed in a tapered shape.

10. The liquid storage container according to claim 1, further comprising a second biasing member configured to bias the seal member moved to the second position by the first biasing member toward the inner communication port.

11. The liquid storage container according to claim 1, wherein a gas-liquid separation membrane configured to separate gas and liquid is provided at the inner communication port.

12. The liquid storage container according to claim 1, further comprising a plurality of ribs provided on a bottom surface of the air communication part,
- wherein each of the plurality of ribs is configured to hold liquid by a capillary force.

13. The liquid storage container according to claim 1, further comprising a liquid supply port configured to supply the liquid held in the liquid reservoir part to an outside.

14. The liquid storage container according to claim 1, wherein the liquid storage container is detachably attached to a printing apparatus for discharging the liquid, and when the liquid storage container is attached to the printing apparatus, the protruding portion of the pressure receiving part is pushed in the second direction.

15. A liquid storage container comprising:
- a liquid reservoir part configured to hold a liquid;
- an air communication part including an air communication port communicating with an atmosphere;
- an inner communication port configured to communicate the liquid reservoir part with the air communication part;
- a seal member configured to close the inner communication port from an inside of the air communication part;
- a first biasing member configured to bias the seal member in a first direction from a first position away from the inner communication port toward a second position of closing the inner communication port;
- a second biasing member configured to bias the seal member moved to the second position by the first biasing member toward the inner communication port; and a pressure receiving part including a protruding portion protruding from the air communication port to an outside of the air communication part, and joined to the seal member or the first biasing member, wherein the seal member is separated from the inner communication port when the protruding portion of the pressure receiving part is pushed in a second direction opposite to the first direction.

16. The liquid storage container according to claim 15, wherein the protruding portion of the pressure receiving part has an extending portion extending in a direction parallel to an opening surface of the air communication port.

17. The liquid storage container according to claim 16, wherein the extending portion is longer than the opening surface of the air communication port.

18. The liquid storage container according to claim 16, wherein the extending portion extends in at least one of the second direction and a third direction orthogonal to the second direction and parallel to the opening surface.

19. The liquid storage container according to claim 15, wherein the air communication port has an opening shape elongated in the second direction.

20. The liquid storage container according to claim 15, wherein the air communication part includes a side wall orthogonal to the first direction, and the inner communication port is provided on the side wall.

* * * * *